(12) United States Patent  
Lindskog et al.

(10) Patent No.: US 6,999,794 B1  
(45) Date of Patent: Feb. 14, 2006

(54) TRANSMISSION OF A COMMON PILOT CHANNEL FROM A BEAMFORMING TRANSMIT ANTENNA ARRAY

(75) Inventors: Erik D. Lindskog, Sunnyvale, CA (US); Mitchell D. Trott, Mountain View, CA (US)

(73) Assignee: ArrayComm LLC, San Jose, CA (US)

( * ) Notice: Subject to any disclaimer, the term of this patent is extended or adjusted under 35 U.S.C. 154(b) by 617 days.

(21) Appl. No.: 10/187,064

(22) Filed: Jun. 28, 2002

(51) Int. Cl.
*H04B 1/38* (2006.01)

(52) U.S. Cl. .................. 455/562.1; 455/63.4; 342/367; 342/368

(58) Field of Classification Search ............. 455/562.1, 455/575.7, 25, 63.4; 343/844; 342/367, 342/368; 370/334
See application file for complete search history.

(56) References Cited

U.S. PATENT DOCUMENTS

| | | | |
|---|---|---|---|
| 6,320,853 B1 * | 11/2001 | Wong et al. ................. | 370/328 |
| 6,453,177 B1 * | 9/2002 | Wong et al. ............. | 455/562.1 |
| 6,556,845 B1 * | 4/2003 | Ide et al. .................. | 455/562.1 |
| 2003/0092379 A1 * | 5/2003 | Brothers et al. ........... | 455/12.1 |
| 2004/0136342 A1 * | 7/2004 | Pedersen et al. ............ | 370/335 |
| 2004/0266354 A1 * | 12/2004 | Hamada et al. ............ | 455/63.4 |

FOREIGN PATENT DOCUMENTS

| | | |
|---|---|---|
| DE | 10026077 A1 | 12/2001 |
| WO | WO01/63776 A2 | 8/2001 |

OTHER PUBLICATIONS

Pederson et al., "A Simple Downlink Antenna Array Algorithm Based on a Hybrid Scheme of Transmit Diversity and Conventional Beamforming", 2001 IEEE, pps. 58-62.
Lindskog et al., "A Transmit Diversity Scheme for Channels with Intersymbol Interference", ICC 2000, Jun. 2000, vol. 1, pps. 307-311.

* cited by examiner

*Primary Examiner*—Lee Nguyen
(74) *Attorney, Agent, or Firm*—Blakely Sokoloff Taylor & Zafman LLP

(57) ABSTRACT

A method and apparatus are provided that allows beamforming to be used on a user-specific signal together with a sector-wide pilot signal in a communication system, such as a CDMA system. In one embodiment, the invention includes a plurality of elements in a defined order to transmit spatially directed signals to specific receiving radio terminals, and a single element, substantially in the center of the ordering to transmit a single pilot signal simultaneously to a plurality of receiving radio terminals.

32 Claims, 5 Drawing Sheets

TRANSMISSION OF A COMMON PILOT CHANNEL FROM A BEAMFORMING TRANSMIT ANTENNA ARRAY

BACKGROUND OF THE INVENTION

1. Field of the Invention

The present invention relates generally to the field of digital radio signal communications. More particularly, the invention relates to transmitting a common pilot channel using an antenna array that is also employed as a beamforming antenna array, such as a spatial diversity antenna system.

2. Description of the Related Art

Many wireless data communication systems use training information or pilot signals that the receiving terminal uses to demodulate received traffic, control, overhead or other signals. One such example is the pilot signal transmitted by a base station in a CDMA (code division multiple access) communications system. Typically a single common pilot signal is transmitted to all remote or subscriber terminals in the base station's coverage area. The coverage area of the base station is typically referred to as a sector. Any signals transmitted to any particular user terminal can then be resolved with the help of the timing and phase information in the common pilot signal.

The pilot signal is particularly effective when the signal propagation path for both the pilot and the user-specific signal is the same. In a CDMA system in which the pilot and user-specific signal are sent over the same frequency band from the same antennas but with different scrambling codes, the pilot signal is very effective. However, any difference between signals makes the pilot signal more difficult to use or, in other words, it makes the user-specific signal more difficult to demodulate. If, for example, the user specific signal is spatially directed toward the remote terminal and the pilot signal is a common sector-wide signal, then the two signals can traverse a different signal propagation path. This will cause the two signals, as received by the remote terminal, to differ.

The propagation channel of the pilot signal and the propagation channel of the traffic channel will differ whenever they are transmitted with beams of different width and shape. The user terminal typically uses the pilot signal to estimate a channel that then is used in the process of demodulating and detecting the symbols transmitted on the traffic channel. The difference in the propagation channel of the pilot signal and the traffic channel therefore reduces the accuracy of the channel estimate. To compensate, each user can be provided with a user-specific pilot signal but this greatly increases the amount of traffic on the network.

BRIEF SUMMARY OF THE INVENTION

A method and apparatus are provided that allows beamforming to be used on a user-specific signal together with a sector-wide pilot signal in a communication system, such as a CDMA system. In one embodiment, the invention includes a plurality of elements in a defined order to transmit spatially directed signals to specific receiving radio terminals, and a single element, substantially in the center of the ordering to transmit a single pilot signal simultaneously to a plurality of receiving radio terminals.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

Beamforming the traffic channels to each user while using a sector-wide pilot signal can increase capacity significantly, however the propagation channel of the traffic channel and the sector-wide pilot typically will differ somewhat. This results in a phase and amplitude difference at the user terminal that can cause the user terminal to incorrectly demodulate the signal from the base station. When maximum gain is desired a pilot transmission weight that minimizes the phase error can be chosen. One such pilot transmission weight can be achieved by transmitting the pilot signals from a center element of the respective antenna array. This way the phase error resulting from the transmissions from the elements on either side of the element transmitting the pilot channel is somewhat balanced out.

This invention allows beamforming to be used on a user-specific signal together with a sector-wide pilot signal in a communication system, such as a CDMA system The present invention is described in the context of wireless base stations for air interfaces that allow beam forming, but it is not so limited. It is particularly applicable to wireless systems in which a pilot signal typically is shared among multiple users at the same time, as is commonly required in standards for CDMA (code division multiple access) systems. Current examples of such wireless systems are WCDMA (wideband CDMA), cdma2000, IS-95 (interim standard 95 of the Telecommunications Industry Association). The present invention may also be applied to some TDMA (time division multiple access) systems such as the downlink of HDR (high data rate for CDMA) and GSM (Global System for Mobile Communications).

Antenna Arrays

Figure 1:
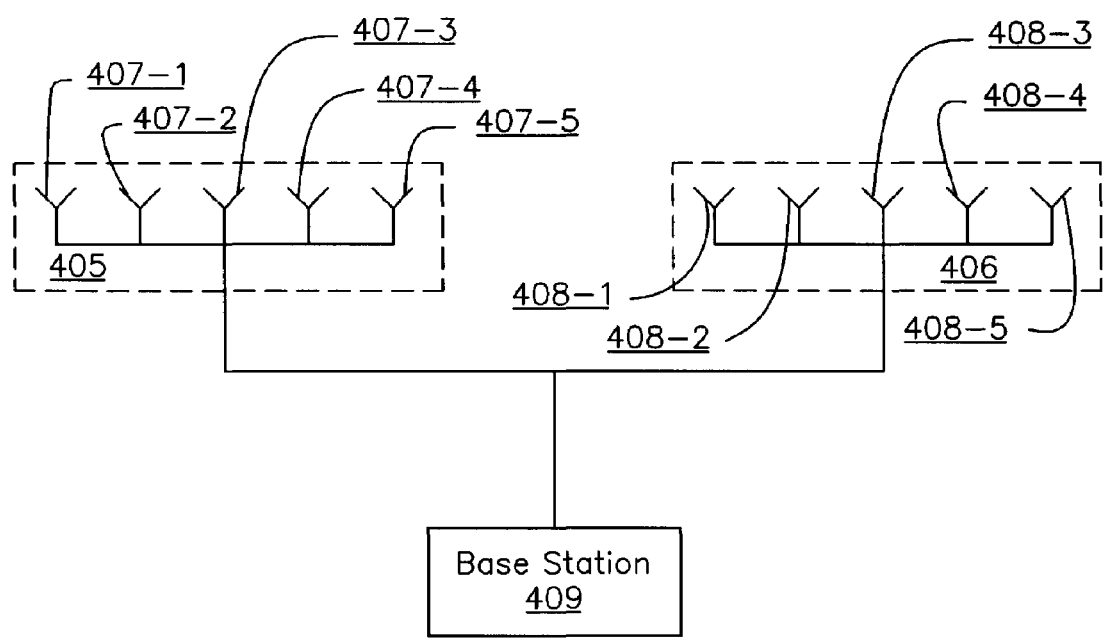
FIG. 1 is a diagram of a five element antenna array suitable for use with the present invention.

FIG. 1 shows a diagram of a transmit antenna arrays 407-1, 407-2, 407-3, 407-4, 407-5 and 408-1, 408-2, 408-3, 408-4 and 408-5 suitable for use with the present invention. The present invention is described in the context of a base station (BS) 409, 429, in a network that includes many base stations, sending a pilot signal to any subscriber stations or remote user terminals that may be within range of the base station. However, the invention may be applied to a wide variety of different systems and terminals.

The base station may be equipped with any of a variety of different antenna configurations. For example, the base station may use two or more spatially separated antenna arrays each with closely spaced antenna elements. The antenna elements can be spaced on the order of one half the wavelength of a typical signal carrier wave, while the arrays are spaced apart by at least a distance of several carrier wavelengths. Antenna arrays with similar spacing between elements can also be used with different polarization. In other words, two arrays of antennas differentiated either by their spatial location (e.g. 10–20 lambda or more apart) or by having different polarization (e.g. +45 and −45 degree polarization respectively) can be applied. Other types of antenna arrays may also be used.

In FIG. 1, there are two antenna arrays 405, 406, each having five elements 407-1 to 407-5, 408-1 to 408-5. The antenna elements are both shown as uniformly spaced linear arrays (ULA) that are spatially diverse. In other words, the antenna elements of each array are arranged equidistant from each other in a straight line. The two arrays are spaced apart from each other sufficient to create an appropriate amount of transmit diversity for the particular system. Each element has a center element 407-3, 408-3, equidistant from the ends of its respective array. Both arrays are driven from the same base station 409 to which they are connected.

In one embodiment of the invention, traffic, control, paging and other user-specific signals are transmitted to each user terminal, respectively, through all of the elements using spatial parameters, such as a weight vector. The user-specific signals can be transmitted out of one or both arrays. The common pilot signal by contrast is transmitted only from the center element of the respective transmitting antenna array. The common pilot is typically used as a phase reference by any receiving remote terminal for demodulating its traffic signal. The common pilot signal can be transmitted with a wide beamwidth that covers the entire coverage area of the base station, an entire sector of the base station or a wide portion of the sector. In another embodiment, the user-specific channels are transmitted from all but the center array. The parameters of the various beams and any weights applied to elements of the arrays are determined in the signal processing resources 31, 33 of the base station.

Figure 2:
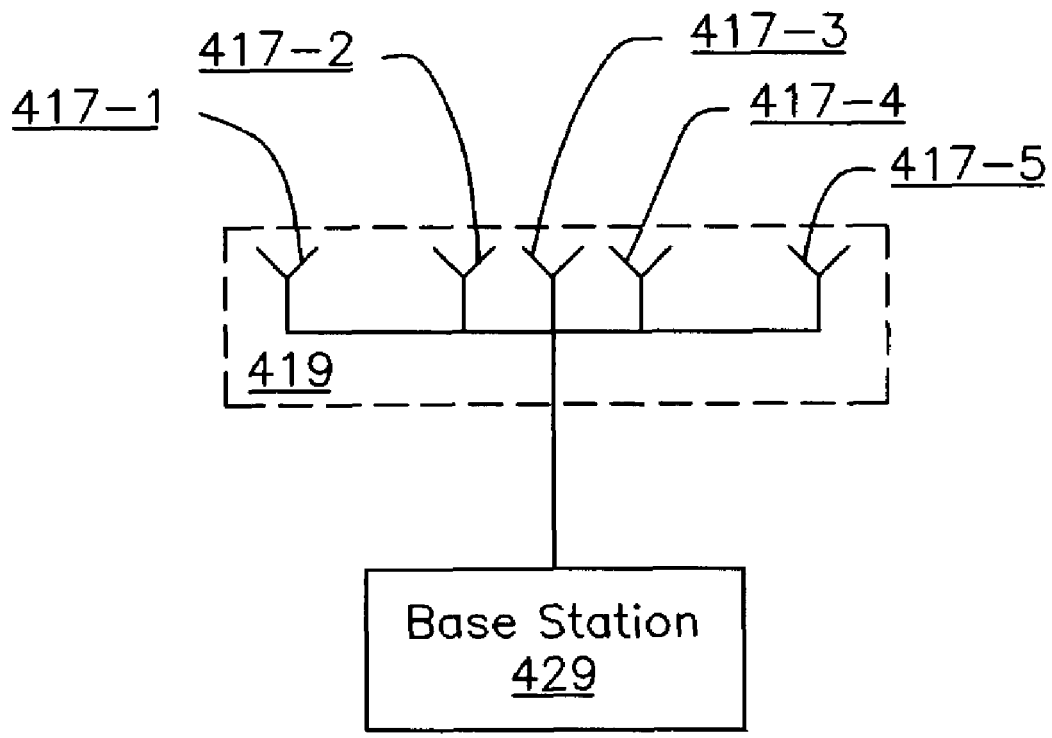
FIG. 2 is a diagram of another five element antenna array suitable for use with the present invention.

In FIG. 2, the elements 417-1 to 417-5 of an antenna array 419 are not spaced evenly apart. The distance between the center element 417-3 and the two neighboring elements 417-2, 417-4 is one half the distance between any of the other elements. As a result, the antenna can be effectively used to form spatially directed beams using all but the center element 417-3 and to transmit pilot signals using only the center element. In another embodiment, there is no center element and the pilot signal is transmitted from one of the adjacent elements 417-2, 417-4. This antenna array is also coupled to a base station 429.

The present invention can also be applied to antenna arrays other than the linear arrays shown. Similar principles can be applied by selecting a centrally located element for the pilot signal and using the full extent or most of the full extent of the array for user-specific signals.

The present invention, in effect, manifests transmit weights for the pilot signal that are approximately symmetrical in magnitude over the elements in the antenna array, such as a ULA. This is achieved exactly by transmitting from the center element. It is achieved approximately by transmitting from an element near the center. The specific choice of transmitting pilot signal element depends on the configuration of the particular array.

If the phase of the dedicated beam and the pilot beam are matched in the approximate direction of the remote terminal, then any error in the phase of the elements on one side of the center element used to transmit the pilot will to a large degree cancel with the errors in the phase of the elements on the other side. By transmitting the pilot signal from the center element, the phase difference between the channel of the pilot signal and the channel of the traffic signal will to a large degree cancel, since the error in the phase from the elements on one side of the pilot element and the other side of the pilot element will have opposite signs. That is, by transmitting from the center antenna element the mismatch over angles close to the angle for which the phase is matched, is reduced.

Phase Matching

The phase of the traffic channel signals can be matched to the phase of the common pilot signals in a variety of different ways well known in the art. For example, user terminal feedback frame or bit error rate feedback can be used to iteratively adjust the phase for best results. Alternatively, the phase can be matched in the novel manner described below.

Figure 3:
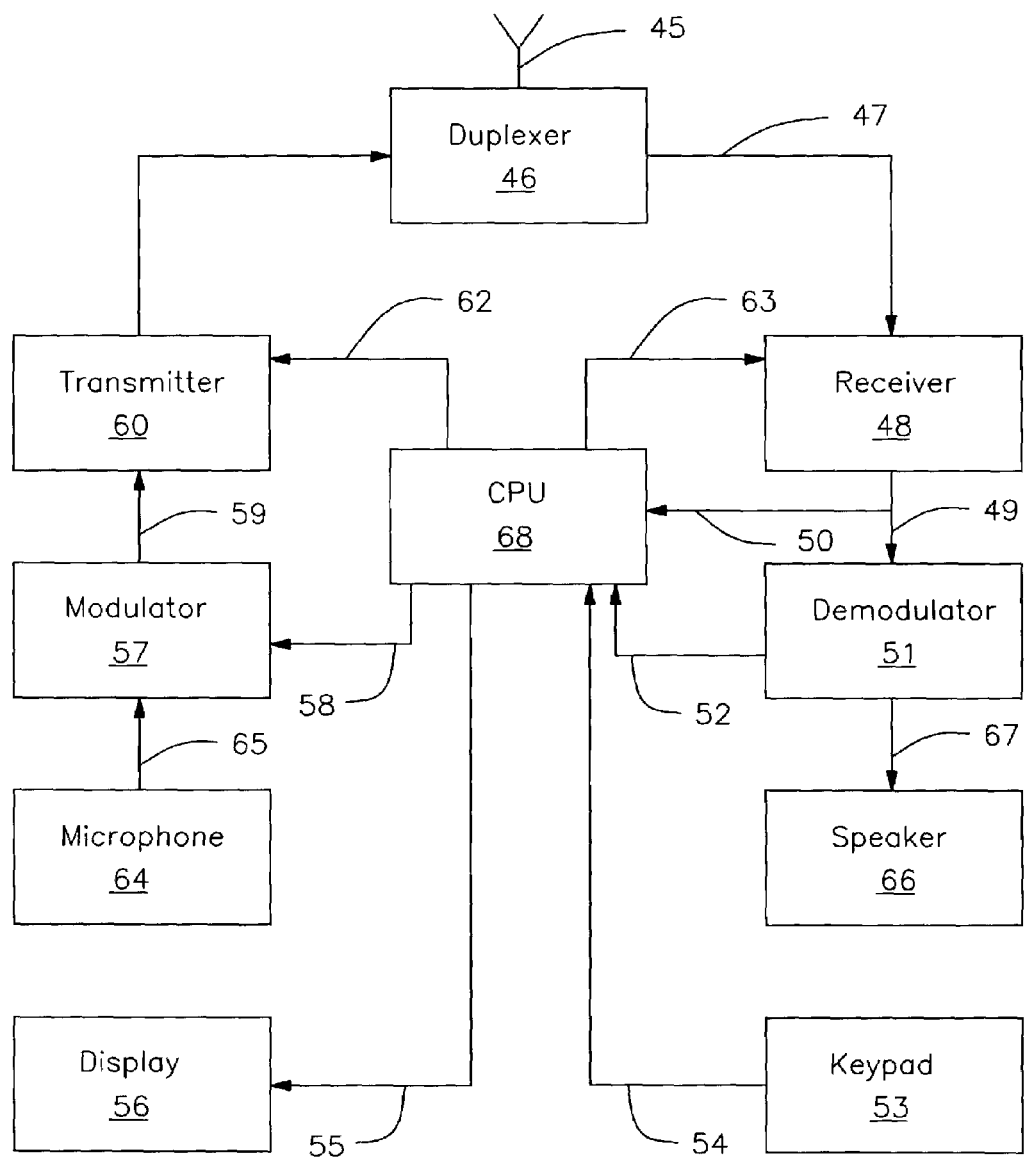
FIG. 3 is a flow diagram of a process for phase matching suitable for use with the present invention.

FIG. 3 shows a process flow diagram for optimizing transmit parameters in accordance with the present invention. This process is described in the context of a base station (BS), in a network that includes many base stations, sending a BCH burst to any subscriber stations or remote user terminals that may be within range of the base station.

Figure 5:
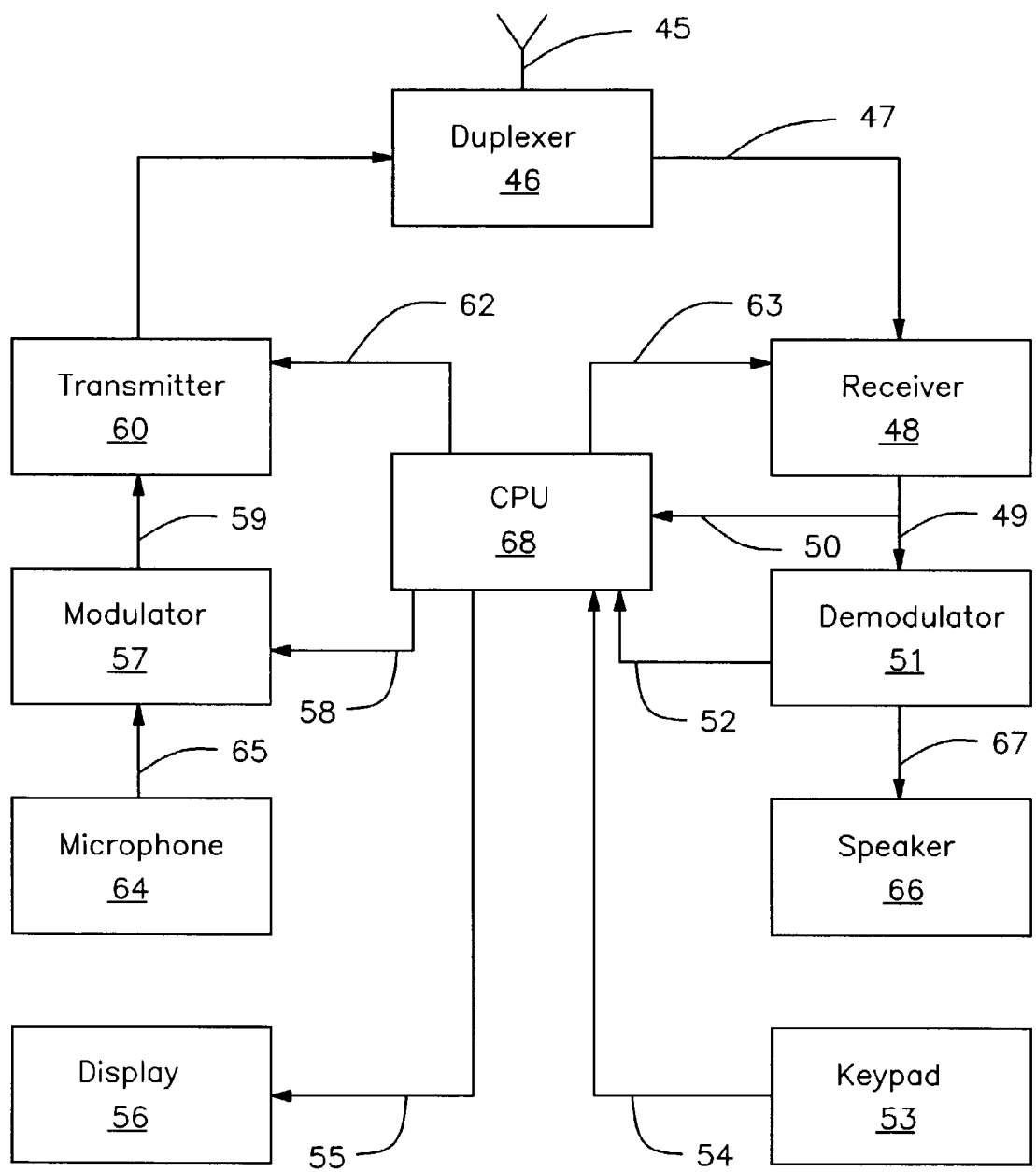
FIG. 5 is a block diagram of a remote terminal on which an embodiment of the invention can be implemented.

First the BS, or any radio operating in accordance with the present invention receives signals from a remote radio 105, for example the subscriber terminal shown in FIG. 5. Based on these received signals the BS can derive estimates of the channel on which the signals were received 107. From the estimate of the receive channel, a model of the expected transmit channel can be derived 109 and from that a model of the transmit weights 111 that can be used to transmit a user-specific signal back to the remote radio over the model of the transmit channel. Alternatively, any other set of parameters can be used instead of weights depending on the design of the system. Some systems may use signatures, vectors, or other types of parameters to control the transmission of a signal by a set of antenna elements.

The weights or other parameters are then optimized before use by a transmit power criterion 113. This can be done by developing a model of the expected transmit channel 115 and applying constraints on the estimated quality of the resulting transmitted signal 117. There are a variety of different constraints as described below. The optimization can be used to maximize the received power of the remote terminal as compared to the transmitted power. Having optimized the transmission parameters, they can be used to transmit a communications signal to the remote terminal 119. For example, the signal can be transmitted to the remote radio by applying a derived set of transmits weights to the elements of a transmit antenna array.

Outer Loop Target SINR Optimization

Considering the example of FIG. 3, above in more detail, the transmission parameters can be optimized in one embodiment of the invention using an outer loop target SINR optimization. In this embodiment, the downlink transmission weights are selected based on estimates of the downlink performance of the selected weights. The estimates are formed using models of the downlink channel derived from the uplink signals. The model can be an estimate of a downlink spatial covariance matrix formed from a corresponding uplink spatial covariance matrix. The performance of the downlink weights can be estimated using the downlink channel model by estimating what outer loop SINR target would be required at the mobile in order to meet some specified outage requirement.

The outage requirement can be formulated in terms of how often the uncoded or coded BER or FER can be below some threshold. The outage requirement can also be formulated as how often the mismatch in phase between the traffic channel and the sector wide pilot can be above a certain level. The downlink weights giving the lowest estimated outer loop SINR target are then selected by solving an optimization problem, minimizing the outer loop SINR target.

The outer loop SINR target optimization approach can be applied to the example of FIG. 3 in many different ways. In one embodiment of the invention, a base station receives signals on an uplink channel from a remote terminal and estimates receive spatial signatures. The receive spatial signature can either be used to estimate transmit spatial signatures or to estimate a transmit spatial covariance matrix. Transmit spatial signatures and transmit spatial covariance matrices can be estimated in a variety of different ways well-known in the art. The transmit signatures or matrices can be a set of transmit signatures or matrices derived on a tap-by-tap basis.

The transmit values can then be optimized using a model of the transmit or downlink channel. A suitable model can be formed as h=R^{H/2}v, where v is a column vector with M complex Gaussian random elements, M being the number of transmit antennas, R^{H/2} being the Hermitian of the Cholesky factorization of the estimated transmit covariance matrix and h being a realization of a transmit spatial signature. Different realizations of the transmit spatial signature can be generated by generating new random vectors v. If sets of signatures or matrices are used, this model can be applied to generate separate estimates of the transmit spatial signatures for different taps in a transmit spatio-temporal channel model.

Using this, or another model, transmit weights can be found that result in the lowest outer loop SINR target such that an outage requirement is met. Several different outage requirements can be used or outage requirements can be combined. One example is that the BER must be less than x percent at least y percent of the time. Another example is that the FER must be less than x percent at least y percent of the time. A third example is that the phase error of the user-specific signal compared to the phase of a pilot signal transmitted using a different weight must be less than x degrees at least y percent of the time. The selection of x and y will depend upon the particular configuration and requirements of a specific implementation.

Applying the outage requirement allows transmit weights to be found using well-known algorithms for non-linear constrained optimization. Alternatively, the solution of the problem can be simplified by selecting from a predetermined family of weights. Each set of weights or weight vector in the family would be determined to produce a beam that gives a maximum gain, computed as a weighted average over some angular region, while meeting a constraint on the maximum deviation in the phase of the beam from the beam used by the sector wide pilot over the same (or different) angular region.

Stated another way, each weight vector in the family of weight vectors is parameterized by one or more real numbers. For example, each weight generates a beam of a different beamwidth. Each weight vector generates a beam that has a constraint on the phase error of the generated beam as compared to the phase error of the beam of, for example a common pilot signal. The phase error constraint can also be a constraint on the maximum phase error as compared to the beam of the pilot signal for a range of angles of arrival. Each weight vector also maximizes a function of the gain over a range of the angles of arrival. The particular parameters and constraints to be used in generating the predetermined family of weight vectors will depend on the particular application.

Power Optimization under a Phase Error Constraint

As an alternative to the outer loop target SINR optimization, in another embodiment, the parameters can be optimized by selecting the downlink transmission weights as the weights that optimize the delivered power given a constraint on the phase error, and on the total transmitted power.

The delivered power can be estimated using any of the downlink channel estimates described above. The constraint on the phase error can be a constraint on the RMS (root mean square) phase error, the x:th percentile of the phase error, where x is selected for a particular implementation, or some other some other convenient form. Alternatively, instead of a phase error constraint, a constraint on the difference between the phasors of the pilot channel complex gain or channel and the traffic channel complex gain or channel, or some other convenient function of the two channels can be used.

The power optimization approach can be applied to the example of FIG. 3 in many different ways. In one embodiment, a base station derives transmit spatial signatures or transmit spatial covariance matrices as described above and a similar model of the downlink channel is derived.

The optimization problem in the present embodiment is to find a transmit weight vector that results in the maximum average delivered power, given a fixed transmit power, such that an outage requirement is met. The outage requirement can take many different forms. One such form is that the phase error of the user specific signal as compared to the phase of a pilot signal transmitted using a different weight must be less than x degrees at least y percent of the time. The transmit weight vector can be found by using constrained optimization algorithms.

As with the example above, the solution of the optimization problem can be simplified using a predetermined set of weight vectors from which to select. The set of transmit weights can be parameterized by one or more real numbers in the same manner as described above.

Base Station Structure

In one embodiment as discussed above, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Techniques well known in the art, can be used to exploit the properties of the training sequences in determining spatial parameters. Further details regarding the use of spatial division and SDMA systems are described, for example, in U.S. Pat. No. 5,828,658, issued Oct. 27, 1998 to Ottersten et al. and U.S. Pat. No. 5,642,353, issued Jun. 24, 1997 to Roy, III et al.

(SDMA) technology can be combined with other multiple access systems, such as time division multiple access (TDMA), frequency division multiple access (FDMA) and code division multiple access (CDMA). Multiple access can be combined with frequency division duplexing (FDD) or time division duplexing (TDD).

Figure 4:
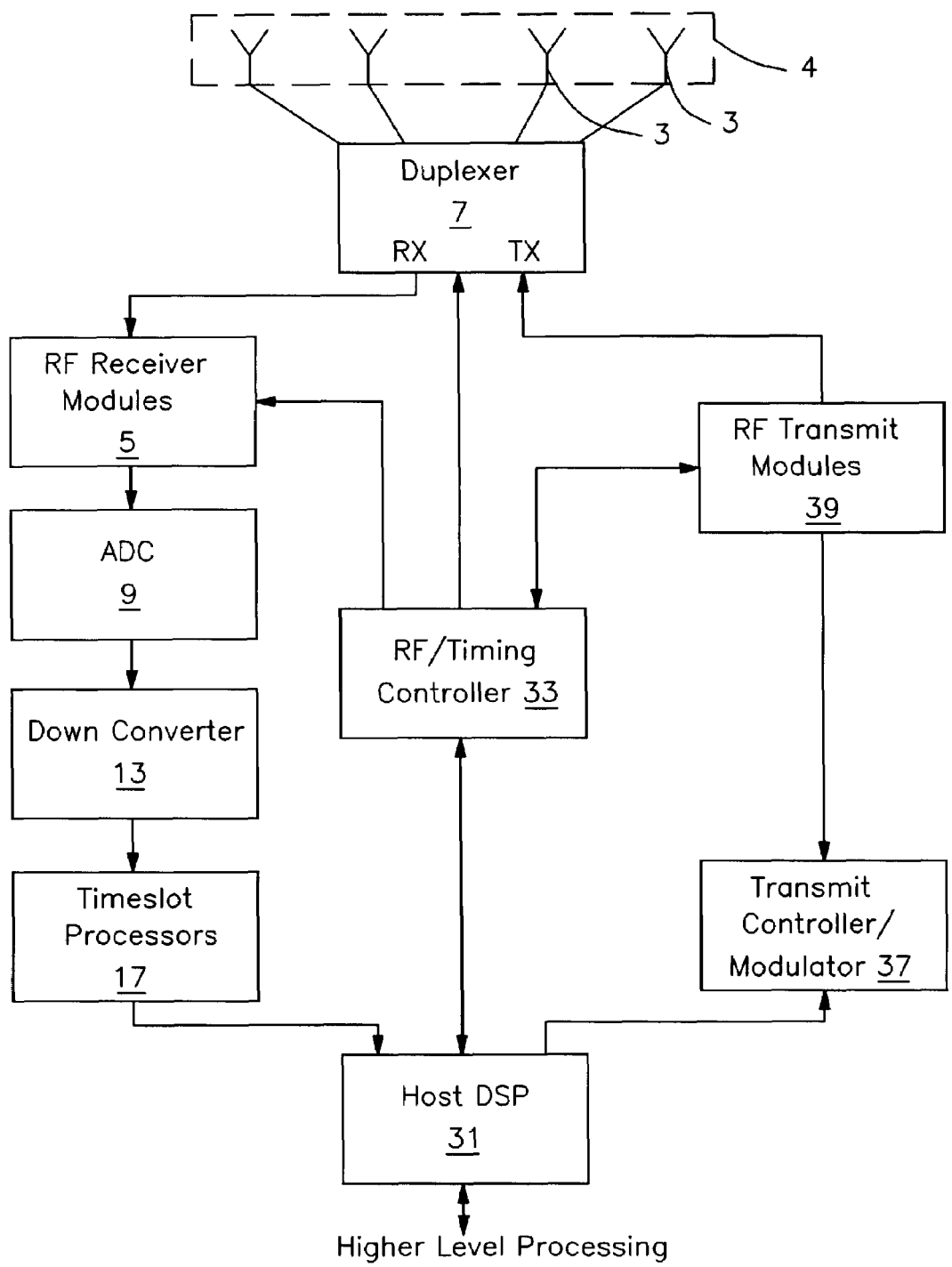
FIG. 4 is a simplified block diagram of a base station on which an embodiment of the invention can be implemented.

FIG. 4 shows an example of a base station of a wireless communications system or network suitable for implementing the present invention. The base station uses SDMA technology which can be combined with other multiple access systems, such as time division multiple access (TDMA), frequency division multiple access (FDMA) and code division multiple access (CDMA). Multiple access can be combined with frequency division duplexing (FDD) or time division duplexing (TDD). The system or network includes a number of subscriber stations, also referred to as remote terminals or user terminals, such as that shown in FIG. 5. The base station may be connected to a wide area network (WAN) through its host DSP 31 for providing any required data services and connections external to the immediate wireless system.

To support spatial diversity, a plurality of antennas 3 is used to form an antenna array 4, for example four antennas, although other numbers of antennas may be selected. Each antenna is an element of a four-element array 4. And a plurality of arrays are provided 4-1,4-2, 4-3. The antenna elements may have a spacing of from one-quarter to four wavelengths of a typical carrier frequency while the arrays may be separated by ten or twenty wavelengths. The best spacing for spatial diversity will depend upon the particular frequencies involved, the physical installation and other aspects of the system. In many applications, the spacing between antenna elements of each array can be less than two wavelengths of the received signal. The spacing between antenna arrays can be more than two wavelengths of the received signal. In general, the spacing between elements in an array is selected to minimize grating lobes when transmissions from each element are coherently combined. In an alternative approach, the arrays are spaced apart so as to form a uniform array of elements. The distance between nearest elements in different arrays is the same as the spacing between elements within an array. As mentioned above, it is also possible for each array to have only a single element.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 31 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7. In a CDMA system, the signals may also be spread and scrambled using appropriate codes.

User Terminal Structure

FIG. 5 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 3 and 4, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base station's could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
    transmitting from a first antenna array a dedicated signal with a narrow beamwidth directed to a remote terminal, the transmit antenna array having a plurality of elements arranged in a substantially linear pattern;
    transmitting from an element of the first antenna array that is in the center of the substantially linear pattern, a common pilot signal for receipt by the remote terminal, the common pilot signal being transmitted with a wide beamwidth.

2. The method of claim 1, wherein the dedicated signal comprises a traffic channel signal.

3. The method of claim 1, wherein the dedicated signal is transmitted by all of the elements of the antenna array in accordance with selected weights and amplitudes for each element.

4. The method of claim 1, wherein the antenna array is an adaptive array for forming beams in the direction of a selected remote terminal.

5. The method of claim 1, wherein the antenna array is a uniform linear array having an odd number of elements and the center element is the element farthest from either end of the linear array.

6. The method of claim 1, further comprising:
    transmitting from a second array a second diversity dedicated signal with a second narrow beamwidth directed to the remote terminal, the second transmit antenna array having a plurality of elements arranged in a substantially linear pattern; and transmitting from an element of the second antenna array that is in the center of the substantially linear pattern, a second common pilot signal for receipt by the remote terminal, the second common pilot signal also being transmitted with a wide beamwidth.

7. The method of claim 6, wherein the first and second dedicated signals are transmitted in accordance with a closed loop transmit diversity mode.

8. The method of claim 6, wherein the first and second antenna arrays are spatially separated.

9. The method of claim 6, wherein the first and second antenna arrays have different polarization orientations.

10. A machine-readable medium having stored thereon data representing instructions which, when executed by a machine, cause the machine to perform operations comprising:
    transmitting from a first antenna array a dedicated signal with a narrow beamwidth directed to a remote terminal, the transmit antenna array having a plurality of elements arranged in a substantially linear pattern;
    transmitting from an element of the first antenna array that is in the center of the substantially linear pattern, a common pilot signal for receipt by the remote terminal, the common pilot signal being transmitted with a wide beamwidth.

11. The medium of claim 10, wherein the dedicated signal comprises a traffic channel signal.

12. The medium of claim 10, wherein the instructions for transmitting the dedicated signal comprise instructions which, when executed by the machine, cause the machine to perform further operations comprising transmitting the dedicated signal by all of the elements of the antenna array in accordance with selected weights and amplitudes for each element.

13. The medium of claim 10, further comprising instructions which, when executed by the machine, cause the machine to perform further operations comprising:
    transmitting from a second array a second diversity dedicated signal with a second narrow beamwidth directed to the remote terminal, the second transmit antenna array having a plurality of elements arranged in a substantially linear pattern; and
    transmitting from an element of the second antenna array that is in the center of the substantially linear pattern, a second common pilot signal for receipt by the remote terminal, the second common pilot signal also being transmitted with a wide beamwidth.

14. The medium of claim 13, wherein the instructions for transmitting the first and second dedicated signals comprise instructions which, when executed by the machine, cause the machine to perform further operations comprising transmitting the first and second signals in accordance with a closed loop transmit diversity mode.

15. An apparatus comprising:
a first transmit antenna array to transmit a dedicated signal with a narrow beamwidth directed to a remote terminal, the transmit antenna array having a plurality of elements arranged in a substantially linear pattern;
an element of the first antenna array that is in the center of the substantially linear pattern to transmit a common pilot signal for receipt by the remote terminal, the common pilot signal being transmitted with a wide beamwidth.

16. The apparatus of claim 15, wherein the dedicated signal comprises a traffic channel signal.

17. The apparatus of claim 15, further comprising a signal processor to select weights and amplitudes for each element and wherein the dedicated signal is transmitted by all of the elements of the antenna array in accordance with the selected weights and amplitudes.

18. The apparatus of claim 15, wherein the antenna array is an adaptive array for forming beams in the direction of a selected remote terminal.

19. The apparatus of claim 15, wherein the antenna array is a uniform linear array having an odd number of elements and the center element is the element farthest from either end of the linear array.

20. The apparatus of claim 15, further comprising:
a second diversity antenna array to transmit a second diversity dedicated signal with a second narrow beamwidth directed to the remote terminal, the second diversity array having a plurality of elements arranged in a substantially linear pattern; and
an element of the diversity antenna array that is in the center of the diversity array to transmit a second common pilot signal for receipt by the remote terminal, the second common pilot signal also being transmitted with a wide beamwidth.

21. The apparatus of claim 20, wherein the first and diversity antenna arrays are spatially separated.

22. The apparatus of claim 20, wherein the first and diversity antenna arrays have different polarization orientations.

23. An antenna array for a spatial diversity radio transmission system comprising:
a plurality of elements in a defined order to transmit spatially directed signals to specific receiving radio terminals; and
a single element, substantially in the center of the ordering to transmit a single pilot signal simultaneously to a plurality of receiving radio terminals.

24. The antenna array of claim 23, wherein the single element is among the plurality of elements.

25. The antenna array of claim 23, wherein the plurality of elements form a uniform linear array.

26. The antenna array of claim 25, wherein the uniform linear array has an element at each end of the array and wherein the single element is substantially equidistant from each end element.

27. The antenna array of claim 23, wherein the spatially directed signals comprise traffic channel signals.

28. The antenna array of claim 23, wherein the antenna array is an adaptive array for forming beams in the direction of a selected remote terminal.

29. The antenna array of claim 23, wherein the antenna array is a uniform linear array having an odd number of elements and the center element is the element farthest from either end of the linear array.

30. The antenna array of claim 23, further comprising:
a diversity array to transmit a diversity spatially directed signals with a second narrow beamwidth directed to specific receiving terminals, the diversity array having a plurality of elements arranged in a substantially linear pattern; and
a diversity single element, substantially in the center of the ordering to transmit a diversity pilot signal from the diversity array simultaneously to the plurality of receiving radio signals.

31. The antenna array of claim 30, wherein the antenna array and the diversity antenna array are spatially separated.

32. The antenna array of claim 30, wherein the antenna array and the diversity antenna array have different polarization orientations.

* * * * *